US005640678A

United States Patent [19]
Ishikawa et al.

[11] Patent Number: 5,640,678
[45] Date of Patent: Jun. 17, 1997

[54] MACROCELL-MICROCELL COMMUNICATION SYSTEM WITH MINIMAL MOBILE CHANNEL HAND-OFF

[75] Inventors: Hiroyasu Ishikawa, Warabi; Yoshio Takeuchi, Ohmiya; Hideo Kobayashi, Fujimi, all of Japan

[73] Assignee: Kokusai Denshin Denwa Kabushiki Kaisha, Tokyo, Japan

[21] Appl. No.: 589,121

[22] Filed: Jan. 19, 1996

Related U.S. Application Data

[63] Continuation of Ser. No. 159,821, Nov. 30, 1993, abandoned.

[30] Foreign Application Priority Data

Dec. 10, 1992 [JP] Japan ..................... 4-352216

[51] Int. Cl.⁶ ..................................... H04Q 7/22
[52] U.S. Cl. .................. 455/33.2; 455/33.4; 455/34.1; 455/56.1; 379/60
[58] Field of Search ..................... 455/33.2, 33.1, 455/33.3, 33.4, 54.1, 54.2, 56.1, 34.1, 34.2, 277.1, 279.1, 62; 379/58–60

[56] References Cited

U.S. PATENT DOCUMENTS

| | | | |
|---|---|---|---|
| 4,759,051 | 7/1988 | Han | 455/33.2 X |
| 5,067,147 | 11/1991 | Lee | 455/33.3 X |
| 5,109,390 | 4/1992 | Gilhousen et al. | 455/33.2 |
| 5,111,534 | 5/1992 | Benner | 455/33.2 |
| 5,265,263 | 11/1993 | Ramsdale et al. | 455/33.2 |
| 5,280,472 | 1/1994 | Gilhousen | 455/279.1 |
| 5,329,555 | 7/1994 | Marko et al. | 455/277.1 |

OTHER PUBLICATIONS

Ogasawara et al. "Dynamic Channel Assignment On Sub-carrier Multi-plexing Transmission Systems" 1992 Spring Meeting of IEICE of Japan B-315.

*Primary Examiner*—Reinhard J. Eisenzopf
*Assistant Examiner*—Philip J. Sobutka
*Attorney, Agent, or Firm*—Emmanuel J. Lobato; Burns & Lobato, P.C.

[57] ABSTRACT

A mobile communication system is disclosed which precludes the necessity for mobile station to perform processing for microcell zone switching even when it moves from one microcell zone to another and which permits high-speed microcell zone handover. The service area of mobile communication is split into a plurality of macrocells; the macrocells are each subdivided into a plurality of microcells; a microcell base station equipped with a transmitting and receiving antenna and a power amplifier is installed in each microcell; a different communication channel is assigned to individual mobile station in the macrocell; even when the mobile station moves from one microcell to another, no channel handover takes place; and only when the mobile station moves from one macrocell to another, a mobile network control center which supervises the macrocell base stations effects channel handover.

4 Claims, 8 Drawing Sheets

MACROCELL-MICROCELL COMMUNICATION SYSTEM WITH MINIMAL MOBILE CHANNEL HAND-OFF

This is a continuation of application Ser. No. 08/159,821, filed Nov. 30, 1993 now abandoned.

BACKGROUND OF THE INVENTION

The present invention relates to mobile radio communication systems such as an analog cordless telephone system, a digital cordless telephone system, a digital intercommunicating radio LAN system, an analog automobile telephone system and a digital automobile telephone system.

In recent years, there have been proposed a cordless telephone system which allows a user to use a cordless telephone while walking in a building, factory or indoors and outdoors, and an automobile telephone system which permits a telephone call and data transmission from an automobile being driven at a high speed; these systems are now being rapidly put to practical use. In existing systems, base stations individually have equipments such as a MODEM and a radio signal monitor set and a communication control station which presides over a plurality of base stations takes charge of channel assignment and channel handover. In a case where the service area is far and wide, however, the cost of system constructed on will rise high because of the necessity of installing a number of base stations and the load on the communication control station will also increase substantially because of simultaneous control of many base stations. Furthermore, in a TDMA/TDD (Time Division Duplex "Ping-Pong transmission") system such as a PHP (Personal Handy Phone) system, precise synchronization between base stations is needed, but the larger the number of base station, the harder their synchronization.

One possible solution to this problem is the configuration of a base station for mobile communication disclosed in a literature "Studies of Dynamic Channel Assignment in Communication between Base Stations which Uses Sub-Carrier Transmission" (Ogasawara, et al., 1992 Spring Meeting of Institute of Electronics, Information and Communication Engineers of Japan, B-315). The proposed configuration is to share a MODEM among a plurality of micro cells. In the above-mentioned literature a macrocell base station has such a configuration as shown in FIG. 8. Reference numeral 10 denotes a macrocell base station, 11 through 1n n MODEMs, 2 a switching circuit for interconnecting the MODEMs and microcell base station antennas, 31 through 3m m microcell base station antennas, 4 a connection control circuit for controlling the MODEMs 11 through 1n and the switching circuit 2 to conduct a signal of a specified channel between a specified MODEM and a specified antenna, 5 a channel assignment control circuit which allocates/deallocates the MODEMs 11 through 1n and channels in accordance with circuit allocation/deallocation and indicates to the connection control circuit 4 the correspondence between the MODEMS 11 through 1n, the channels and the microcell base station antennas 31 through 3m, 8 mobile station and 91 through 9m microcell zones which are covered by the microcell antennas 31 through 3m.

Moreover, there is proposed in a literature "Radio Signal Collection/Distribution System for Microcell Mobile Communication Using Optical Fiber Transmission" (Shibuya, et al., RCS90-12) an optical microcell system which interconnects each microcell base station and a macrocell base station with optical fiber cables, in contrast to the above-mentioned wire microcell base station concentration system employing the sub-carrier transmission. This system transmits an optical signal over the optical fiber cables after converting thereto a radio-frequency (RF) signal in the conventional radio section by means of electro-optic (E/O)/opto-electric (O/E) signal converters installed in each of the microcell and macrocell base stations. In this system, each microcell base station needs only to have an antenna for signal transmission and reception use, an O/E-E/O converter and a power amplifier, and a MODEM and other radio equipment can collectively be provided in the macrocell base station. This permits substantial miniaturization of the microcell base station and affords a substantial reduction of its cost. Besides, in the case of changing the zone configuration, reshuffle and relocation of microcell base stations can easily be done and software modification of the macrocell base station can also be effected under centralized control. Hence, the optical microsystem utilizing optical fiber cables can be said to be a promising next generation microcell system which is highly excellent from technical and economical points of view as well as in terms of system configuration.

According to the optical fiber microcell base station concentration system utilizing the sub-carrier transmission, in the case of establishing a channel assignment control circuit 5 allocates the MODEM and the channel to be used and indicates to the connection control circuit 5 a combination of the allocated MODEM and channel and an antenna which covers the microcell zone where the mobile station is located. Based on the combination of the MODEM, the channel and the antenna indicated from the channel assignment control circuit 5, the connection control circuit 4 controls the transmitting/receiving frequency of the MODEM and the connection between the MODEM and the antenna via the switching circuit, that is, the connection control circuit 4 operates so that a signal of the specified channel is transmitted between the specified MODEM and the specified antenna.

As regards a method for switching zones when the mobile station moves from one zone to another, there has not been proposed so far any particular method suitable for use with this system configuration. Supposing use is made of a method which, after detecting the necessity of zone handover in the macrocell base station or mobile station, performs zone handover following a predetermined procedure between the base station and the terminal equipment as is the case with a system having an individual MODEM for each microcell zone, the mobile station also needs to have a processing feature for zone handover.

As mentioned above, in the case of employing conventional base stations for mobile communication, although MODEMs are shared among zones, it is necessary that when moving from one zone to another, the mobile station perform zone handover through the same procedure as in the system having a MODEM for each zone; thus, the mobile station needs to follow the zone handover procedure and the zone handover takes so much time that there is a possibility of a break occurring in communication.

SUMMARY OF THE INVENTION

The present invention is intended to solve the above-noted problems of the prior art, and an object of the invention is to provide a mobile communication system which precludes the necessity of performing any particular processing for zone handover by the mobile station and permits high-speed zone handover.

Furthermore, the use of the base station for mobile communication according to the present invention allows utilization of various diversities, and hence offers a mobile communication system which permits remarkable improvements in the receiver performances of both, of the base station and the mobile station by virtue of the diversity effect.

The above-mentioned problems of the prior art could be solved by the invention which utilizes novel methods characteristic thereof listed below.

In an aspect, the present invention relates to a concentration system for mobile communication wherein: the service area is split into a plurality of microcells each having a radius of smaller than about 100 m; a microcell base station composed of a transmitting/receiving antenna and a power amplifier is provided in each microcell; each microcell base station and a macrocell base station which supervise a plurality of microcell base stations are interconnected by a terrestrial link or radio channel; and the macrocell base station has MODEMs corresponding to the individual microcell base stations and processes signals which are transmitted from and received by all the microcell base stations; and wherein an independent communication channel is assigned to each mobile station in the macrocell so that no channel handover is needed when the mobile station moves from one microcell to another. Moreover, an antenna switching control circuit is added to the afore-mentioned conventional base station for mobile communication, and on the basis of the receiving level of a signal from the mobile station received via a plurality of antennas, the antenna switching circuit indicates to the connection control circuit a change the combination of the MODEM, the channel and the antenna, thereby controlling the switching circuit to start antenna switching.

In the case where channels are assigned for each macrocell base station, a channel control station for mobile communication, which controls a plurality of macrocell base stations, needs to effect channel handover when the mobile terminal equipment shifts from one macrocell zone to another. This calls for a hand-over procedure which is used in ordinary microcell mobile communication systems.

In contrast thereto, the channel control station for mobile station, which controls a plurality of macrocell base stations, places the channel assignment to all mobile station under its centralized control and, in principle, an independent channel is assigned to each mobile station in the plurality of macrocell zones placed under the supervision of the channel control station. Only when the channel control station for mobile communication runs out of channels to be assigned under its control, a channel in a macrocell zone fartherest from that where the mobile station requesting the assignment thereto of a channel is present, or a channel assigned to mobile station in a macrocell zone to which the channel requesting mobile station is least likely to move is assigned thereto.

By placing the above-mentioned channel assignment under sole control of the channel control station for mobile communication, it is possible to provide a system which is substantially free from the necessity of performing the handover procedure for channel assignment even when the mobile station moves from one microcell to another.

According to another aspect of the present invention, a transmission signal from the mobile station is received by antennas of all microcell base stations in the macrocell, and the macrocell base station detects and compares the received signal levels in all the microcell base stations placed under its supervision. The macrocell base station judges that the mobile station is present in that one of the microcell base stations which has the maximum received signal level, and selects that microcell base station and demodulates the received signal from the selected microcell base station, while at the same time it transmits a signal from a fixed network to the mobile station from the selected microcell base station.

According to still another aspect of the present invention, the transmission signal from the mobile station is received by antennas of all microcell base stations in the macrocell and the macrocell base station detects the received signal levels and instantaneous phases of the received signals in all the microcell base stations placed under its supervision and selects those of the microcell base stations whose received signal levels are higher than a threshold level. Further, the macrocell base station puts the received signals from the selected microcell base stations into an in-phase relation, weights the received signals in accordance with their received signal levels, combines them into a maximum ratio composite signal and demodulates it, while at the same time transmits a signal from a fixed network to the mobile station via the plurality of selected microcell base stations after putting modulation signals corresponding to the selected microcell base stations reverse to the instantaneous phases detected from the plurality of received signals used for the maximum ratio combination.

Since the present invention performs antenna switching by controlling the switching circuit on the basis of the received level of a signal from the mobile station detected in the macrocell base station as mentioned above, the mobile station needs not to carry out processing for zone handover when it moves from one zone to another, and the zone handover can be achieved at a high speed without incurring a break in communication. Moreover, since the channel assignment to all mobile station is placed under the sole control of the channel control station for mobile communication which supervises a plurality of macrocell base stations, it is possisble to construct a simple microcell mobile communication system which does not substantially involve handover processing even when the mobile station moves from one macrocell to another.

Besides, it is possible to offer stable communication services to users at all times by comparing with one another the received levels of the signal transmitted from the mobile station to all of the microcell base stations and transmitting a down-channel signal from the microcell base station of the maximum received signal level.

In addition to the above method, received signals of a plurality of microcell base stations are combined with a maximum ratio through the use of their instantaneous phase detected values to thereby improve the receiver performance in the up channel, and transmission signals are reversed in phase from the above-said instantaneous phase detected values and then transmitted from the plurality of microcell base stations at the same time to thereby obtain at the mobile station the same receiving gain as in the case of maximum ratio combined diversity reception; thus, the system of the present invention improves the receiver performance as compared with a selectively combined technique with site diversity transmitting and receiving system.

BRIEF DESCRIPTION OF THE DRAWINGS

The present invention will be described in detail below with reference to accompanying drawings, in which.

PREFERRED EMBODIMENTS OF THE INVENTION

Figure 1:
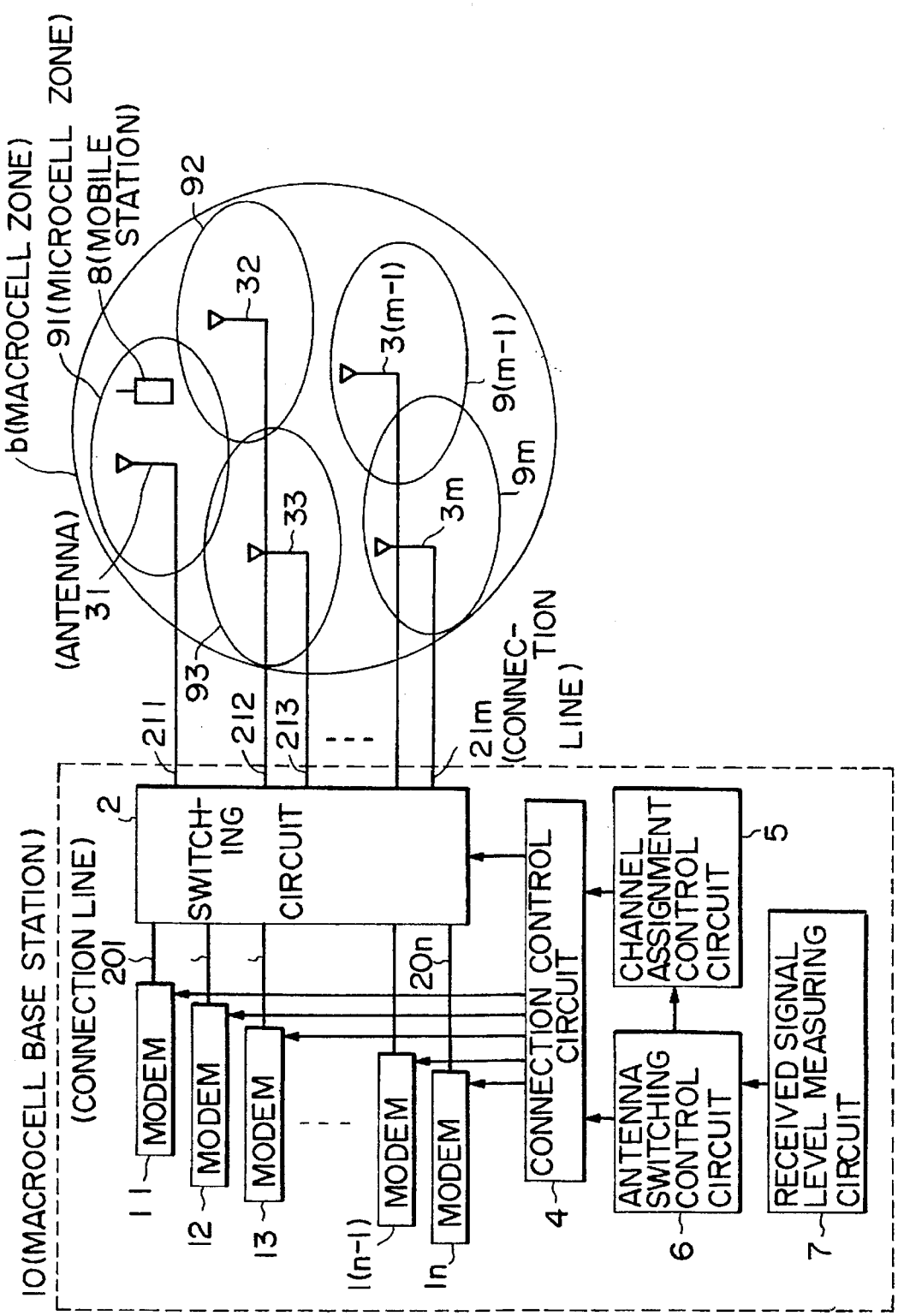
FIG. 1 is a block diagram illustrating an example of the construction of the present invention.

FIG. 1 illustrates an example of the construction of the base station for mobile communication according to the present invention. Reference numeral 10 denotes a macrocell base station, 11 through 1n denote n MODEMs; 2 denotes a switching circuit for interconnecting the MODEMs and antennas of microcell base stations; 31 through 3m denote m antennas; 4 denotes a connection control circuit which controls the MODEMs and the switching circuit to conduct a signal of a specified channel between a specified MODEM and a specified antenna; 5 denotes a channel assignment control circuit which allocates/deallocates the MODEMs 11 through 1n and channels in accordance with the circuit allocation/deallocation and indicates to the connection control circuit 4 the combination of the MODEMs 11 through 1n, the channels and the antennas 31 through 3m; 7 denotes a received signal level measuring circuit for measuring the level of a signal received from mobile station via an antenna; 6 denotes an antenna switching control circuit which indicates to the connection control circuit 4 a change in the combination of the MODEMs 11 through 1n, the channels and the antennas 31 through 3m in the case of switching an antenna to another on the basis of the received signal level measured by the received signal level measuring circuit 7; 8 denotes mobile station; 91 through 9m denote microcell zones which are covered by the antennas 31 through 3m; and b denotes a macrocell zone which covers the microcell zones 91 through 9m.

A description will be given first of an operation for setting up a communication circuit between the mobile station 8 and the macrocell base station 10. Assume that the mobile station 8 is located in the zone 91 and is to establish a communication channel between it and the macrocell base station 10. In this case, the macrocell base station detects the zone where the mobile station 8 is present, by a method such as the afore-mentioned comparison of the levels of the electric wave received form the mobile station 8. Thus, it is detected that the mobile station 8 is present in the zone 91, and the macrocell base station 10 sets a communication circuit between it and the mobile station via the antenna 31. More specifically, the macrocell base station 10 selects the MODEM and the communication channel to be used for communication with the mobile station 8, by the channel assignment control circuit 5, and indicates to the connection control circuit 4 the combination of the selected MODEM, the selected communication channel and the microcell base station antenna 31 to be connected thereto. Assuming that the assigned MODEM is 11 and the number of the assigned communication channel 1, the connection control circuit 4 controls the switching circuit 2 so that a signal of the channel of number 1 is transmitted between the MODEM 11 and the microcell base station antenna 31. Further, a communication circuit is connected between the microcell base station antenna 31 and the mobile station 8 by radio transmission. In this way, the communication circuit, which uses the MODEM and the communication channel assigned by the macrocell base station, is set up between the macrocell base station 10 and the mobile station 8. Incidentally, the communication channel herein mentioned is distinguished in terms of a frequency slot in the case of an FDMA communication system, a time slot (and a frequency slot) in the case of a TDMA system and a code for spectrum spreading in the case of a CDMA (Code Division Multiple Access) system. The operation of the connection control circuit 4 differs with the kind of communication system used. In the case of the FDMA or CDMA communication system, the connection control circuit 4 indicates to the assigned MODEM the channel number corresponding to the frequency slot or code at the time of setting a communication circuit and controls the switching circuit 2 so that the assigned MODEM and the microcell base station antenna covering the zone in which the mobile station requesting the circuit is present are fixedly connected during communication. In the case of the TDMA communication system, the connection control circuit 4 indicates to the assigned MODEM the channel number corresponding to the time slot (and the frequency slot) at the time of setting a communication circuit and controls the switching circuit 2 so that the assigned MODEM and the antenna of the microcell base station covering the zone of the mobile station requesting the communication circuit are connected only during the time slot.

Next, a description will be given of an operation which is performed when the mobile station 8 moves among the microcell zones 91 through 9m. Let it be assumed that the mobile station 8 is located in the microcell zone 91 and in communication with the macrocell base station 10 via the microcell base station antenna 31 and, for the sake of brevity, that microcell zones adjoining the zone 91 are only those 92 and 93. In this instance, the destination of the mobile station 8 from the microcell zone 91 is the microcell zone 92 or 93 along. The received signal level measuring circuit 7 always or periodically measures the level of a signal received from the mobile station 8 via the microcell base station antenna 31, or in response to a request from the mobile station 8. Now, let the measured level be represented by L1. When the received signal level L1 becomes lower than a preset threshold level, the received signal level measuring circuit 7 judges that the mobile station 8 is moving from the microcell zone 91 toward the adjoining microcell zone and, measures the levels of signals received from the mobile station 8 via the microcell base station antennas 32 and 33 covering the adjoining microcell zones 92 and 93. Let the thus measured levels be represented by L2 and L3. In this case, if L2>L1 and L2>L3, then the received signal level measuring circuit 7 concludes that the mobile station 8 has moved to the microcell zone 92. If L3>L1 and L3>L2, then it is concluded that the mobile station 8 has moved to the microcell zone 93. In the former case, since it is concluded that the mobile station 8 has moved to the microcell zone 92, communication that has been held so far between the macrocell base station 10 and the mobile station 8 via the microcell base station antenna 31 is switched to be maintained via the microcell base station antenna 32. More specifically, when the mobile station 8 is initially in the microcell zone 91, it communicates with the macrocell base station 10 via the MODEM 11, and let the number of the communication channel used in this case be represented by 1. Even after having moved to the microcell zone 92, the mobile station 8 still keeps on communication via the MODEM 11 and over the communication channel No. 1; hence, the mobile station 8 needs not to take microcell zone handover into account. To perform such zone handover, the antenna switching control circuit 6 instructs the connection control circuit 4 to change the combination of the MODEM 11, the channel No. 1 and the antenna 31 to a combination of the MODEM 11, the channel No. 1 and the antenna 32. The connection control circuit 4 has controlled so far the switching circuit 2 to provide the communication channel No. 1 between the MODEM 11 and the antenna 31 but in response to the instruction from the antenna switching control circuit 6 it controls the switching circuit 2 to switch the MODEM 11 from the antenna 91 to the antenna 92. Thus, only antenna switching is needed when the mobile station 8 has moved from the microcell zone 91 to the adjoining one 92.

Figure 5:
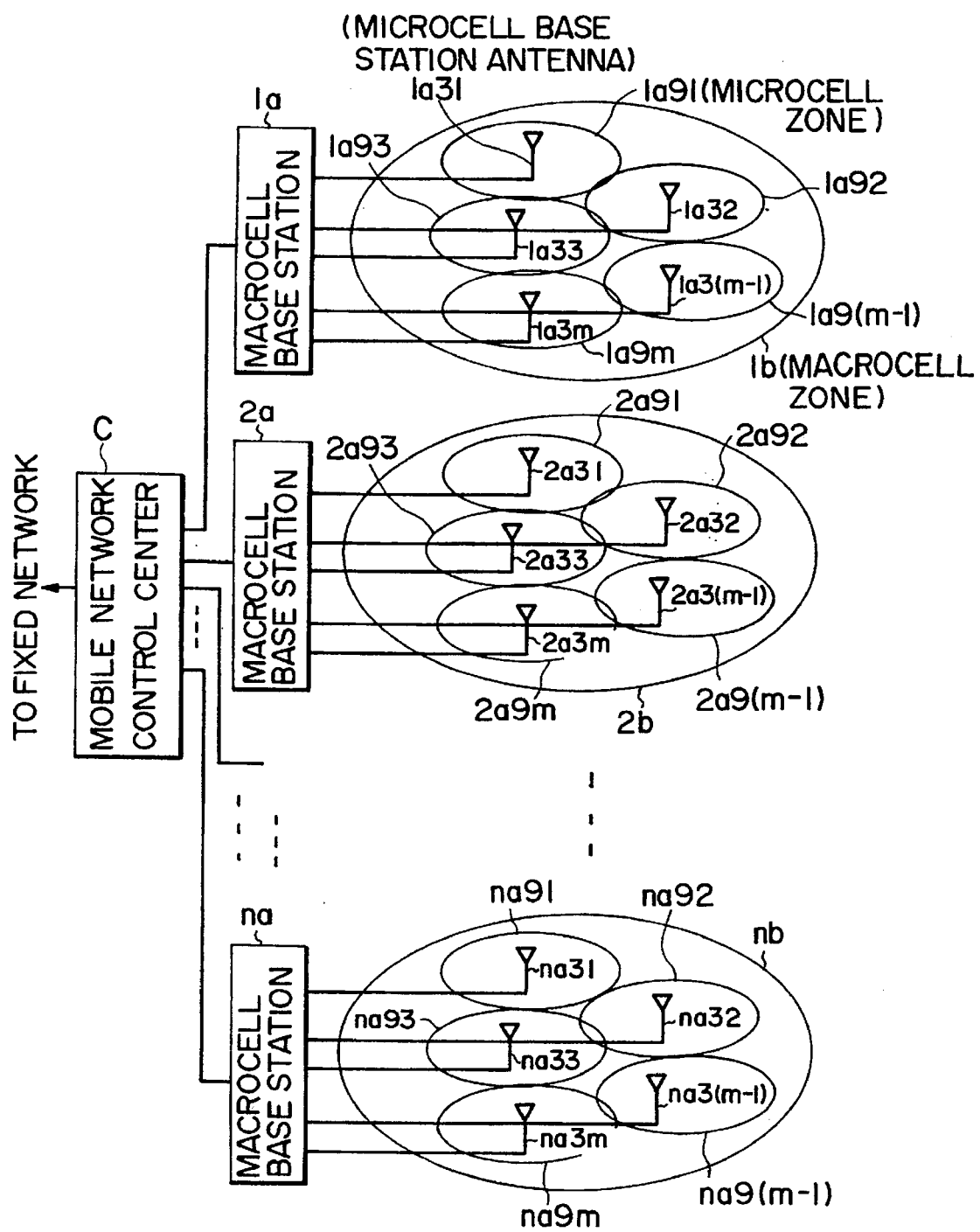
FIG. 5 is a block diagram explanatory of control switching of the connection between microcell base stations in the present invention.

Next, a description will be given of the case of the mobile station moving from one macrocell zone to another. As shown in FIG. 5, an ordinary mobile communication system requires a mobile network control center c which supervises a plurality of microcell zones 1b through nb and connects a communication circuit between a fixed network and a mobile communication network. The communication control unit has complete command of pieces of individual information such as the microcell zone of a macrocell zone in which the mobile station is being engaged in communication, and the frequency and the slot number of the channel being used by the mobile station. Now, consider the case of assigning channels to mobile station independently for each of macrocell base stations 1a through na. In this case, there is the possibility of different users using the same communication channel in different macrocell zones; so that when mobile station in the macrocell zone 1b, for instance, moves therefrom to the macrocell zone 2b, the received signal level of a signal transmitted from a microcell base station antenna 1a 9m drops below a prescribed threshold (When mobile station moves from one microcell zone to another microcell zone in the same macrocell zone, the received signal level will not become lower than the threshold level for macrocell zone handover because the microcell base station antenna is automatically switched.), and a handover request for the macrocell zone 1 is presented to the macrocell base station 1a through a control channel. The macrocell zone handover request is transferred to the mobile network control center c, which secures an unused communication channel in the macrocell zone 2n for the mobile station requesting the macrocell zone handover and then follows an ordinary hand-over procedure (an existing method) to perform handover from the microcell zone 1a 9m to the microcell zone 2a 9l between different macrocell zones.

On the other hand, in the case where the mobile network control center c which supervises all the macrocell zones in through nb controls the channel assignment to all mobile station, an independent communication channel is assigned to individual mobile station in all of the macrocell zones 1b through nb placed under the supervision of the mobile network control center c and no channel handover is involved even when mobile station moves from one macrocell zone to another. Only when all the channels for assignment are occupied or busy, the communication channel, which is being used by mobile station in the macrocell zone fartherest from that in which the channel requesting mobile terminal equipment is located or the macrocell zone to which the requesting mobile station is least likely to move, is assigned thereto; for instance, when the channel requesting mobile station is in the macrocell zone 1b, the communication channel, which is being used by mobile station in macrocell zone remotest from that of the requesting mobile station, is assigned. This permits construction of an extremely simple-configured mobile communication system which hardly involves the handover processing.

Figure 2:
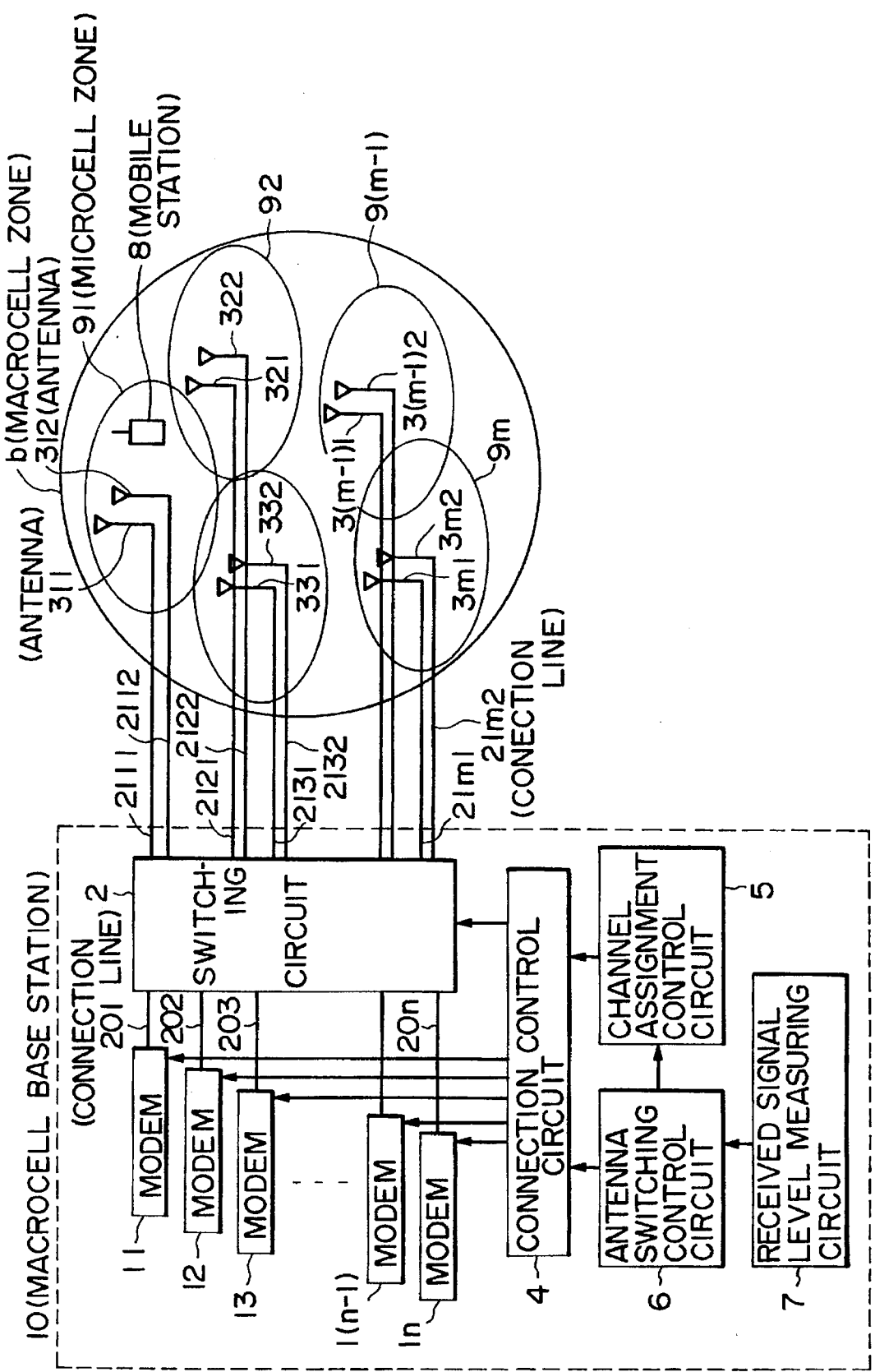
FIG. 2 is a block diagram illustrating another example of the construction of the present invention.

Moreover, a space diversity for selecting an antenna is also possible by providing a plurality of antennas in each microcell base station forming the mobile communication system of the present invention. FIG. 2 shows an example in which two antennas are provided in one microcell base station. Reference numerals 311 and 312 denote two antennas installed in the microcell base station in the microcell zone 91, 321 and 322 two antennas installed in the microcell base station of the microcell zone 92, . . . , 3m 1 and 3m 2 two antennas installed in the microcell base station of the microcell zone 9m. A description will hereinbelow be given of an operation for an antenna selection diversity.

Let it be assumed that the mobile station 8 is in the microcell zone 9i and is engaged in communication with the macrocell base station 10. The received signal level measuring circuit 7 always or periodically measures the levels of signals received from the mobile station 8 via the antennas 311 and 312. The thus measured signal levels will hereinafter be represented by La and Lb. When La>Lb, the macrocell base station 10 and the mobile terminal equipment 8 communicate via the antenna 311, whereas then Lb>La, they communicate via the antenna 312. In concrete terms, the macrocell base station 10 and the mobile station 8 communicate with each other using the MODEM 11. Now, assume that the number of the communication channel being used is No. 1. In the case of using the antenna 311 for communication, the antenna switching control circuit 6 indicates to the connection control circuit 4 a combination of the MODEM 1i, the channel number 1 and the antenna 311, and the connection control circuit 4 controls the switching circuit 2 so that a signal in the communication channel No. 1 conducts between the MODEM 11 and the antenna 311. In the case of using the antenna 312 for communication, the antenna switching control circuit 6 indicates to the connection control circuit 4 a combination of the MODEM 11, the channel No. 1 and the antenna 312, and the connection control circuit 4 controls the switching circuit 2 so that a signal in the communication channel No. 1 conducts between the MODEM 11 and the antenna 312.

Figure 3:
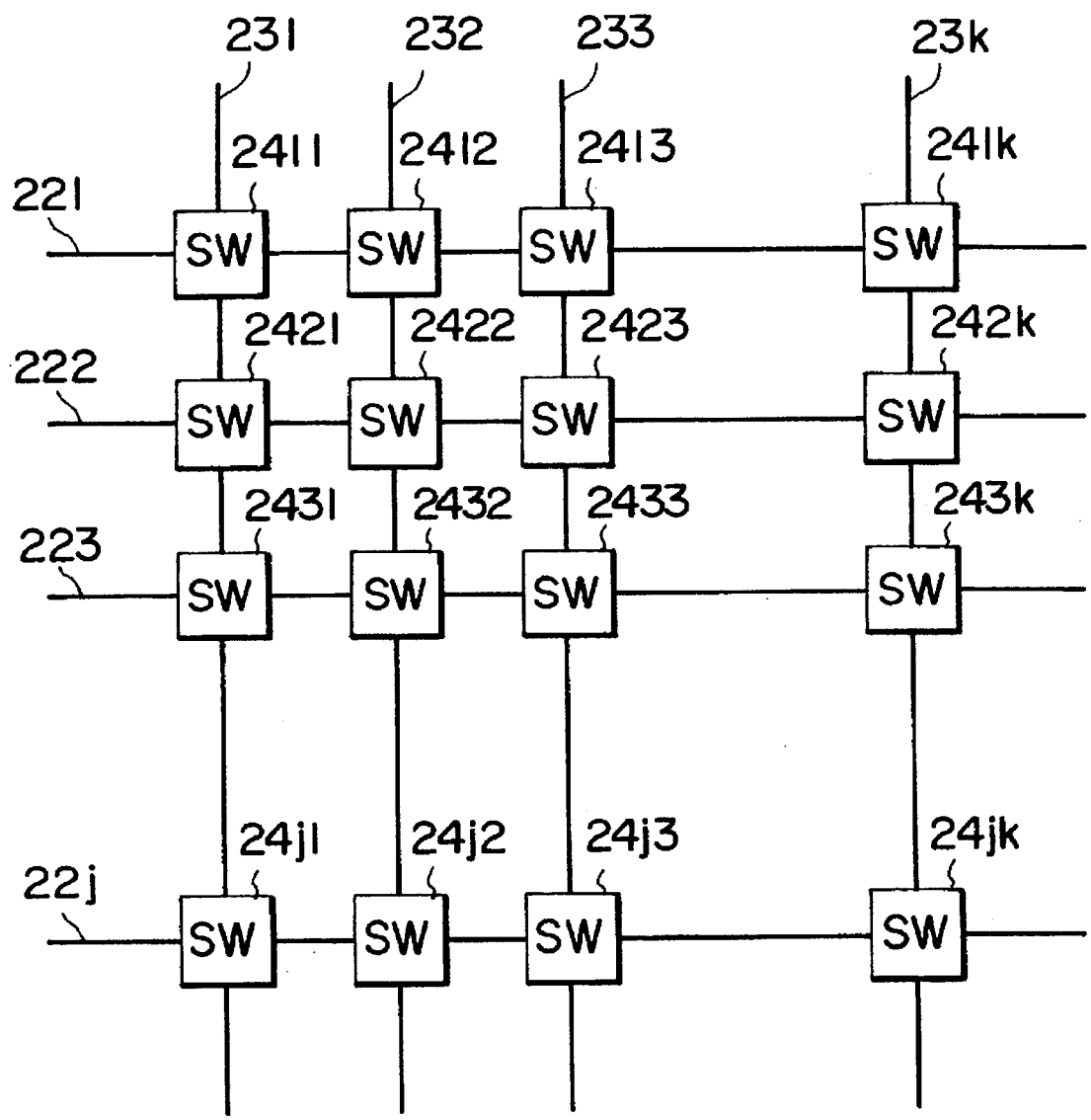
FIG. 3 is a block diagram showing a specific operative example of a switching circuit for use in the present invention.
Figure 4:
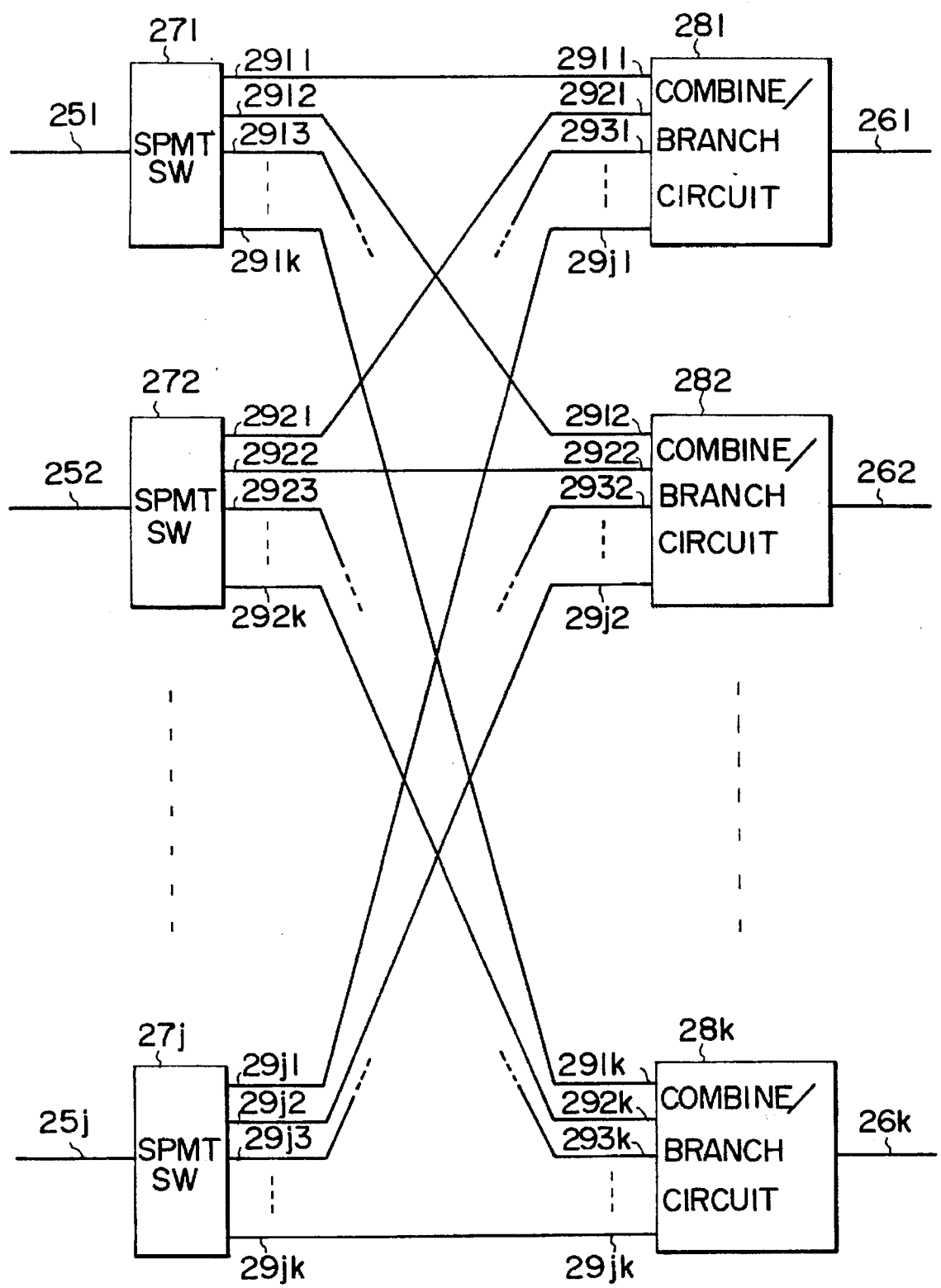
FIG. 4 is a block diagram showing another specific operative examples of the switching circuit for use in the present invention.

The switching circuit 2 may be formed by a switch matrix such as shown in FIG. 3 or a combination of SPMT (Single Pole Multithrow) switches and combine/branch circuits such as shown in FIG. 4. In FIG. 3, reference numerals 221 through 22j denote j MODEM side connection lines, which correspond to connection lines 201 through 20n in FIGS. 1 and 2; 231 through 23k denote k antenna side connection lines, which correspond to connection lines 211 through 21m in FIG. 1 or connection lines 2111, 2112 through 21m1, 21m2 in FIG. 2; and 2411 through 24jk denote coupling or combination switches, which effect ON/OFF control of combinations of the MODEM side connection lines 221 through 22j and the antenna side connection lines 231 through 23k. Hence, arbitrary combinations of MODEMs and antennas can be obtained by controlling the the combination switches 2411 through 24jk. For example, the MODEM 12 and the antenna 33 in FIG. 1 can be connected by turning ON the switch 2423.

In FIG. 4, reference numerals 251 through 25j denote j MODEM side connection lines, which correspond to the connection lines 201 through 20n in FIG. 1; 261 through 26k denote k antenna side connection lines, which correspond to the connection lines 211 through 21m in FIG. 1 or connection lines 2111, 2112 through 21m1, 21m2 in FIG. 2; 271 through 27j denote SPMT switches; 281 through 28k denote combine/branch circuits; and 2911 through 29jk denote connection lines between the SPMT switches and the combine/branch circuits. The SPMT switches 271 through 27j each select an antenna to which the connection line from the MODEM is to be connected. Each combine/branch circuit combines/branches signals between the connection lines from all of the SPMT switches and one antenna. Hence, arbitrary combinations of MODEMs and antennas can be implemented by controlling the connection of the SPMT switches. For example, the MODEM 12 and the antenna 33 in FIG. 1 can be connected by controlling the SPMT switch 272 to connect the MODEM side connection line 252 to the connection line 2923 leading to the combine/branch circuit 283.

The transmission system between the MODEM and the antenna may be a base band, intermediate-frequency, or radio-frequency transmission system, and between the switching circuit and the antenna, an electric signal can be transmitted as an optical signal.

The switching circuit may be formed using optical switches as well as base band switches and IF/RF switches. The use of optical switches permits enhancement of the isolation in the switching circuit, expecially in the case of conducting the IF/RF transmission between the MODEM and the antenna. Besides, in the case of employing an optical signal transmission between the switching circuit and the antenna, no photoelectric conversion is needed at the joint between them, and hence a conversion loss can be avoided.

The above has described specific embodiments of the switching circuits and embodiments of the space diversity utilizing them. Next, embodiments of the site diversity transmission and reception system will be described. With a view to making clear techniques of the site diversity transmission and reception system, the above-described switching circuit will be omitted in the following description; in practice, however, the application of the switching circuit permits implementation of the site diversity transmission and reception system without any difficulty. Furthermore, it is easy to combine the afore-mentioned antenna selection diversity with the site diversity transmission and reception system described below.

Figure 6:
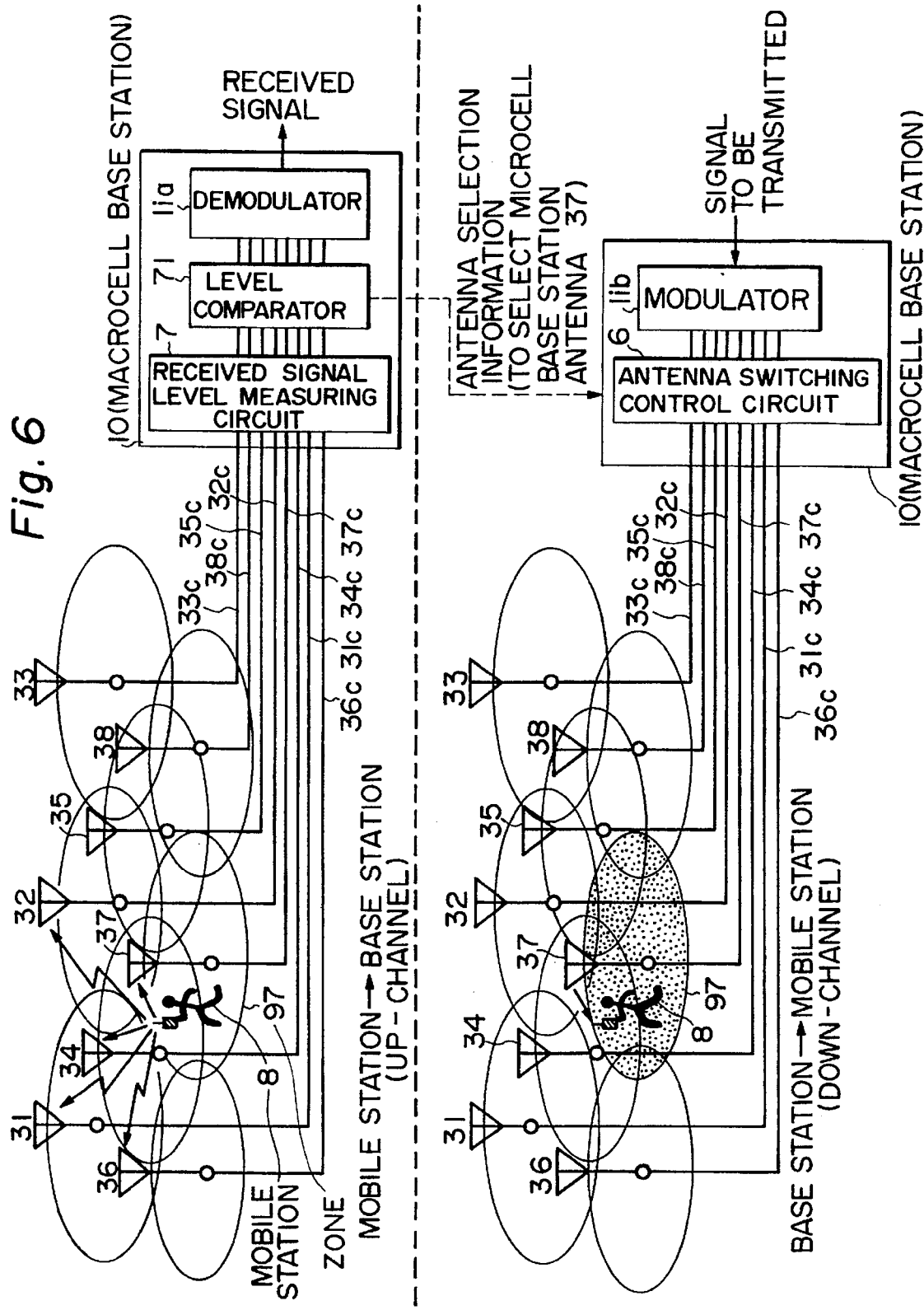
FIG. 6 is a block diagram illustrating an embodiment for microcell base station antenna selection diversity transmission and reception according to the present invention.

FIG. 6 illustrates an embodiment of a microcell base station antenna selection diversity transmission and reception system. In FIG. 6, a transmission signal from the mobile station 8 is received by all microcell base station antennas 31 to 38 in the macrocell zone, and the macrocell base station 10 detects, by the received signal level measuring circuit 7, the received signal levels at all of the microcell base station antennas 31 through 38 placed under the supervision of the macrocell base station 10 and selects, by a level comparator 71, the microcell base station antenna 37 which presents the maximum received signal level. In this situation, it is concluded that the mobile station 8 is present in the zone 97 covered by the selected microcell base station antenna 37, and the received signal which is transmitted from the microcell base station antenna 37 over a wire cable 37c is demodulated by a demodulator 1ia. while at the same time a signal from a fixed network is modulated by a modulator 1ib and is then transmitted as a down-channel signal to the mobile station 8 from the microcell base station antenna 37 selected at the time of reception. Thus, a stable communication with a high received signal level can be achieved at all times. Moreover, in this instance, the application of the afore-mentioned space diversity to the microcell base stations further improves the receiver performance in combination with the site diversity.

Figure 7:
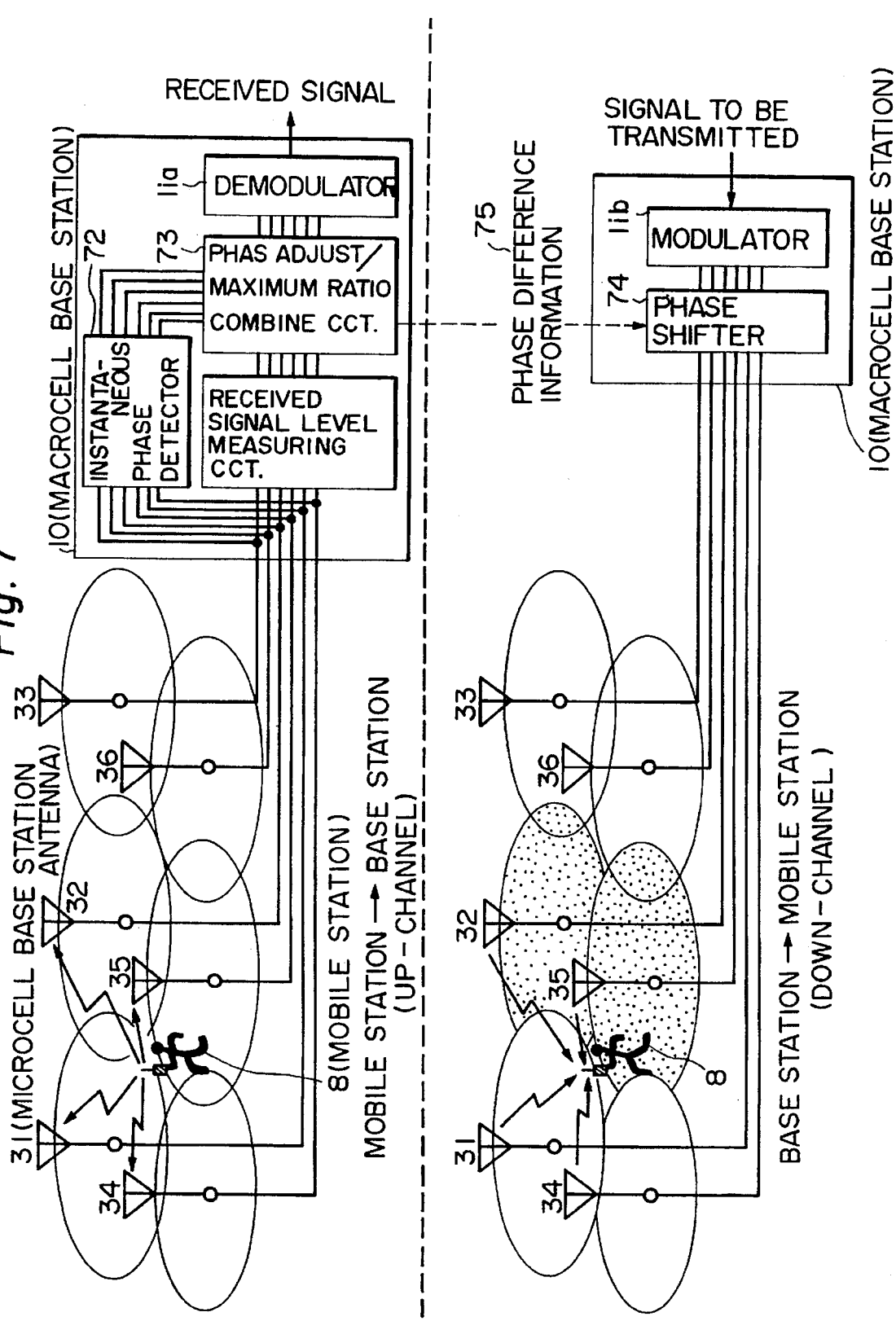
FIG. 7 is a block diagram illustrating an embodiment for microcell base station antenna maximum ratio combined site diversity transmission and reception according to the present invention.
Figure 8:
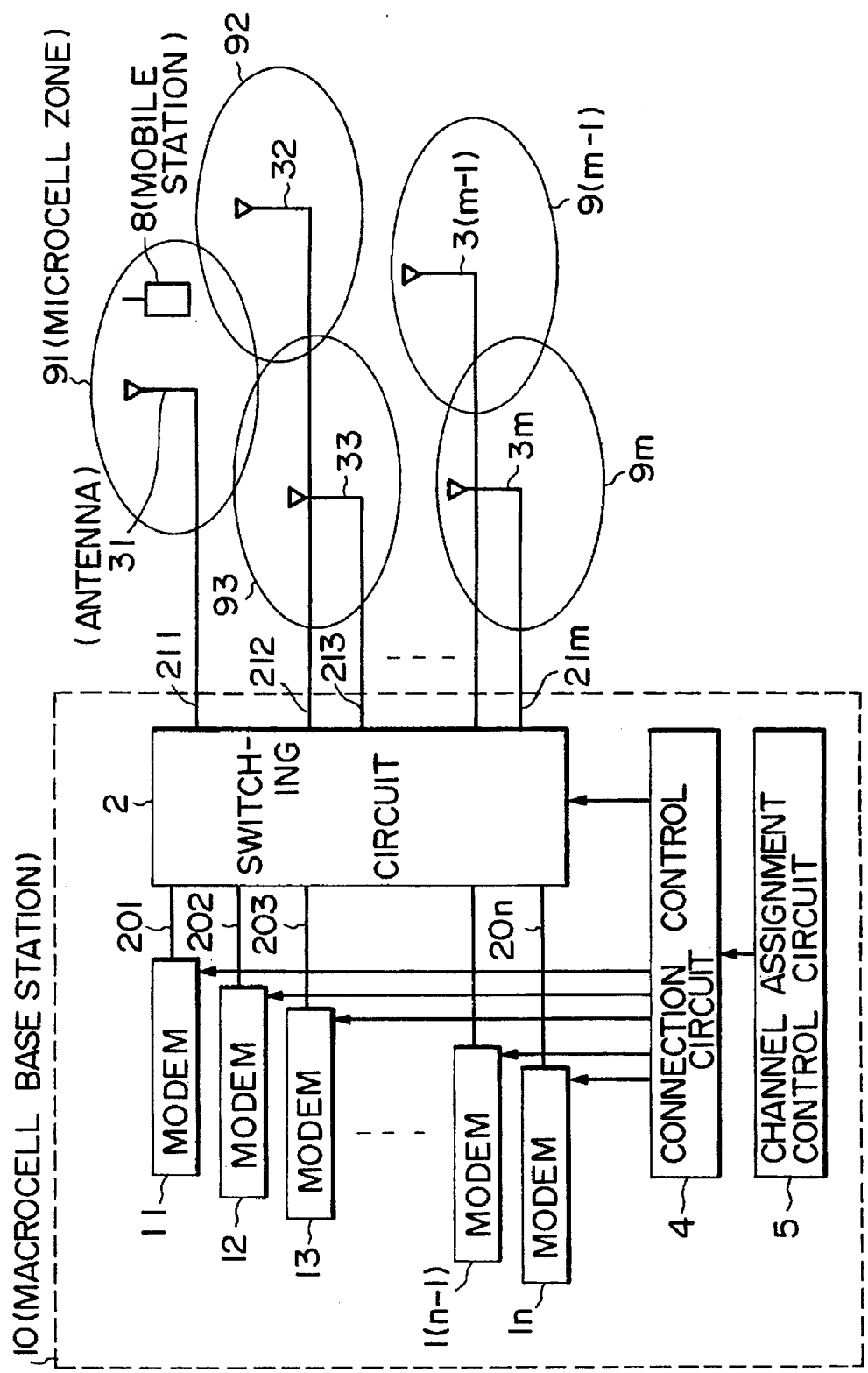
FIG. 8 is a block diagram showing an example of a conventional macrocell base station.

FIG. 7 illustrates an embodiment of a macrocell base station antenna maximum ratio combined site diversity transmission and reception system. In FIG. 7, the transmission signal from the mobile station 8 is received by all the microcell base station antennas 31 through 36 in the macrocell. In the macrocell base station 10, the received signal levels and instantaneous phases at all the microcell base station antennas 31 through 36, placed under its supervision, are detected by means of the received signal level measuring circuit 7 and an instantaneous phase detector 72, and the microcell base station antennas 31, 32, 34 and 35 are selected whose received signal levels are higher than a certain threshold level. At the same time, the plurality of received signals from the selected microcell base station antennas are put into an inphase relation and weighted according to their levels by a phase adjust/maximum ratio combine circuit 73, and the plurality of received signals are combined and detected as a maximum ratio combined signal, which is demodulated by a demodulator 1ia. By this, it is possible to further improve the receiver performance of the macrocell base station of the microcell base station antenna selection diversity transmission and reception system, that is, the receiver performance in the up-channel. One possible method for the phase adjustment is that the instantaneous phase of that one of the received signals by the selected microcell base station antennas which has the maximum signal level is set as a reference phase, with which the other selected received signals are put in phase. The difference from the reference phase, detected at this time, is utilized as phase difference information 75 during down-channel transmission.

Next, a description will be given of a method whereby the signal from the fixed network is transmitted from the macrocell base station to the mobile station via the microcell base station antenna. Assuming that of the microcell base station antennas 31, 32, 34 and 35 selected at the receiving the up-channel signal, the microcell base station antenna 35 is the highest in the level of the received signal, the instantaneous phase of the received signal is used as a reference phase. Letting differences between the instantaneous phases of the signals received by the microcell base station antennas 31, 32 and 34 and the reference phase be represented by $\Delta\theta 31$, $\Delta\theta 32$, and $\Delta\theta$, respectively, down-channel modulation signals which are transmitted from the microcell base station antennas 31, 32 and 34 are phase shifted $-\Delta\theta 31$, $-\Delta\theta 32$, and $-\Delta\theta 34$ by a phase shifter 74. After this, the down-channel modulation signals are simultaneously transmitted to the mobile station 8 from the selected microcell base stations 31, 32 and 34, whereby the maximum ratio combined diversity reception equivalently takes place at the mobile station 8. This further improves the receiver performance at the mobile station 8 as compared with the afore-mentioned select combined site diversity system. When the transmitted power from any of the microcell base stations is the same in the macrocell base station, the diversity gain can be made larger than in the case of using the afore-mentioned antenna select combined site diversity reception system; hence the number of microcell base stations in one macrocell zone can be reduced as shown in FIG. 7.

As will be appreciated from the above, the present invention has such advantages as mentioned below.

(1) High quality and high reliability of communication during moving of mobile station between microcell zones.

(2) Simplification of the system configuration because of unnecessity for the hand-over procesure between microcell zones.

(3) Reduction of cost of the system configuration because of unnecessity for the hand-over procedure between microcell zones.

(4) High quality of communication by virtue of space diversity.

(5) High quality of communication by vertue of site diversity.

(6) Reduction of cost for the system construction by increasing the microcell base station spacing.

(7) Reduction of cost of mobile station owing to unnecessity of the hand-over procedure.

What we claim is:

1. A mobile communication system wherein a service area of mobile communication is divided into a plurality of macrocell zones each composed of a plurality of microcell zones, a microcell base station having a transmitting and receiving antenna and a power amplifier disposed in each of said microcell zones, microcell base stations in respective macrocell zones and a macrocell base station supervising them being interconnected via terrestrial links or radio links, said macrocell base station comprising a plurality of MODEMs corresponding to said microcell base stations placed under the supervision of said macrocell base station, and said macrocell base station processes signals which are transmitted from and received by all of said microcell base stations, said mobile communication system having different communication channels assigned to individual mobile stations in each of said macrocell zones;

no channel handover takes place even when each of said mobile stations moves from one of said microcell zones to another while said links are switched at said macrocell base station on at basis of a received level from said mobile station;

only when each of said mobile stations moves from one of said macrocell zones to another, a mobile network control center for mobile communication, supervising said plurality of macrocell base stations, manages channel handover, said mobile network control center for mobile communication solely supervising channel assignment to respective mobile stations;

different channels being assigned to individual mobile stations in said plurality of macrocell zones;

when each of said mobile stations moves from one of said macrocell zones to another, if all channels are not already assigned, no channel handover takes place; and only when all the channels are already assigned, a channel used by one of said mobile stations in a macrocell zone remotest from that where any of said mobile stations requesting channel assignment or in a macrocell zone to which said requesting mobile station is least likely to move is assigned to said channel requesting mobile station.

2. A mobile communication according to claim 1, in which said macrocell base station comprises: a plurality of MODEMS; a plurality of antennas; a switching circuit for interconnecting said MODEMS; and said antennas; a connection control circuit for connecting said MODEMs and said switching circuit to transmit a signal of a specified channel between a specified one of said MODEMs and a specified one of said antennas; a channel assignment control circuit which allocates/deallocates said specified MODEM and said specified channel in accordance with a channel allocation/deallocation and indicates to said connection control circuit a correspondence between or a combination of said specified MODEM and said specified channel; a received signal level measuring circuit for measuring the received signal levels of said antennas in an arbitrary one of said channels; an antenna switching control circuit starting antenna switching on the basis of the measured signal levels by said received level measuring circuit and indicating to said connection control circuit a change of the combination of said MODEM and said channel; and each of said macrocell base stations uses an optical fiber line as a transmission line interconnecting each of said antennae and said switching circuit and optical switches for said switching circuit.

3. A mobile communication system according to claim 1, in which the use of a microcell base station antenna selection diversity transmission and reception system, wherein a transmission signal from each of said mobile stations is received by all of said microcell base stations in one of said macrocell zones, and said macrocell base station in said one of said macrocell zones detects and compares with one another the received signal levels at said antennas of all of said microcell base stations placed under the supervision of said macrocell base station, concludes that said one of said mobile stations is present in that one of said microcell zones which corresponds to the microcell base station of the maximum received level, selects said one of said microcell base stations, demodulates said received signal of said selected microcell base station by a demodulator corresponding thereto and provided in said macrocell base station, and transmits data from a fixed network to said selected mobile station from said selected microcell base station, thereby improving the receiver performance of said mobile station.

4. A mobile communication system according to claim 1, in which a microcell base station antenna maximum ratio combined technique with site diversity transmission and reception system is employed wherein a transmission signal from any one of said mobile stations is received by all of said microcell base stations in said macrocell zone, and said macrocell base station in said one of said macrocell zones detects the received signal levels and instantaneous phases of said signal detected in all of said microcell base stations placed under the supervision of said macrocell base station, selects those of said microcell base stations whose received signal levels exceed a certain threshold level, puts said plurality of received signals from said selected microcell base stations in phase with each other and weights them according to their received signal levels, detects their sum as a maximum ratio combined signal, demodulates said maximum ratio combined signal by a demodulator provided in said macrocell base station, puts modulation signals corresponding to said selected microcell base stations reverse to said instantaneous phases detected from said plurality of received signals used for generating said maximum ratio combined signal, and then transmits signals from a fixed network to said one of said mobile stations from selected microcell base stations at the same time, thereby improving the receiver performance of said one mobile station.

* * * * *